Sept. 6, 1932.  A. G. WISE ET AL  1,876,267
AUTOMATIC RELEASE CLUTCH FOR MOTOR DRIVE ON CAMERAS
Filed March 13, 1929  2 Sheets-Sheet 1
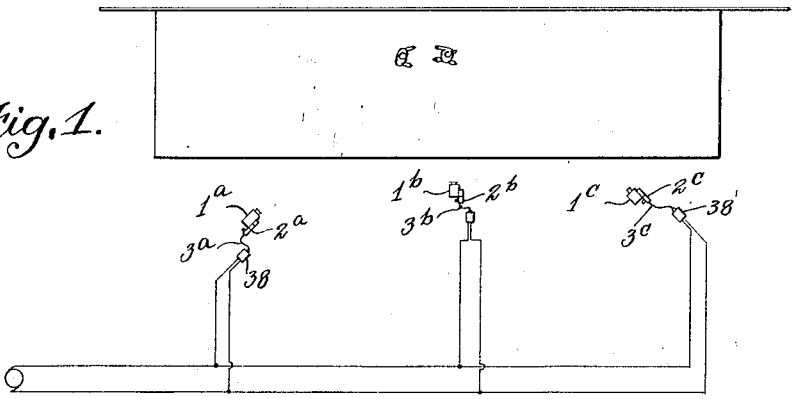
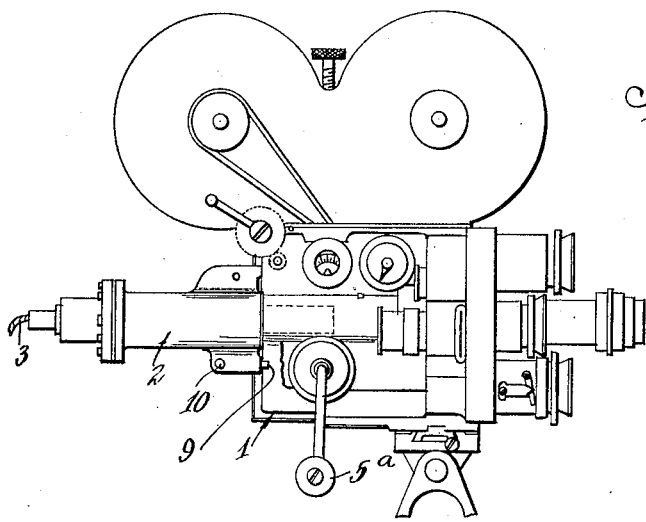
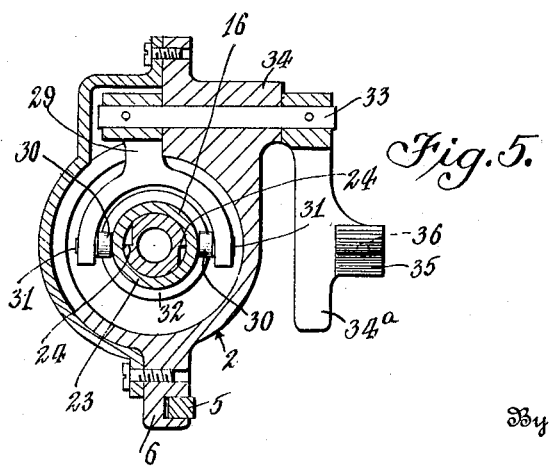
Inventor
Anthony G. Wise
John Arnold
By Lyon & Lyon
Attorneys

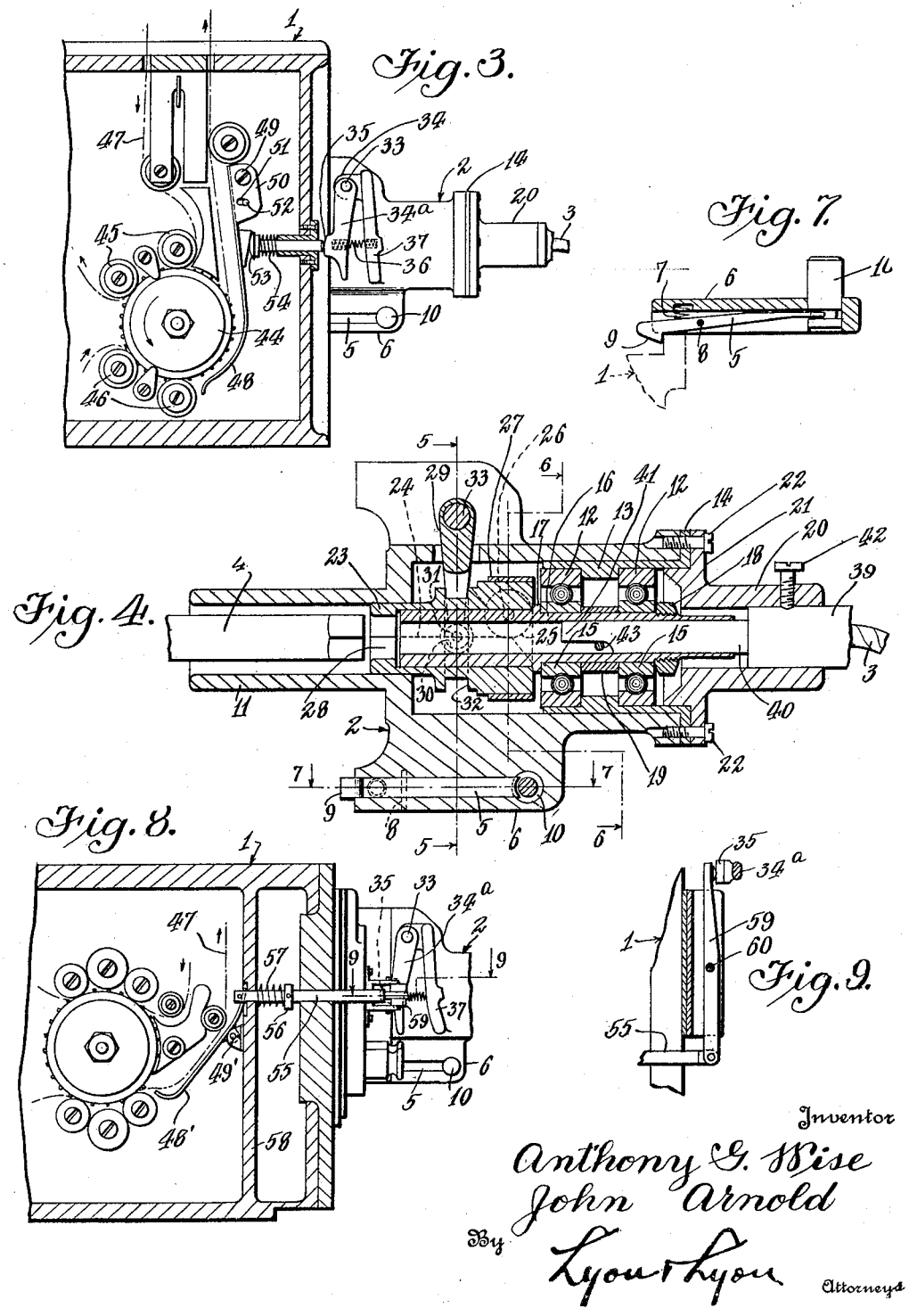

Patented Sept. 6, 1932

1,876,267

UNITED STATES PATENT OFFICE

ANTHONY G. WISE, OF BEVERLY HILLS, AND JOHN ARNOLD, OF LOS ANGELES, CALIFORNIA, ASSIGNORS TO METRO-GOLDWYN-MAYER CORPORATION, OF CULVER CITY, CALIFORNIA, A CORPORATION OF NEW YORK

AUTOMATIC RELEASE CLUTCH FOR MOTOR DRIVE ON CAMERAS

Application filed March 13, 1929. Serial No. 346,577.

This invention relates to a clutch particularly adapted for use in connection with power driven photographic equipment such as, for example, cameras, printers and the like.

In photographing scenes with motion picture cameras it is sometimes desirable to simultaneously photograph a scene with a plurality of cameras. When this is done the cameras are adjusted so that one of said cameras is recording a close-up of one or more of the actors while other cameras take full length views of the actors, or even a more distant view of the scene. This method of simultaneously photographing a scene by means of a plurality of cameras is now being used extensively whenever sound effects are being produced simultaneously with the action.

In order to synchronize the action with the sound it is necessary that all of the cameras operate at the same speed. Of course, it is not necessary to have all three cameras record the action simultaneously for a long period of time; preferably one camera records for a certain length of time and is then followed by cameras number 1b and 1c, or camera 1b which is then followed by camera 1c. A certain amount of overlapping occurs between the actual scenes taken by cameras 1a, 1b and 1c and such overlapping is desirable in that it facilitates correlating the scenes recorded by the different cameras so that the film may be cut at the proper time or frame and when joined together form a continuous record of the action which coincides with the sound effect recorded simultaneously with the action.

It is impossible to have the various cameras operated at the same speed if manual operation is relied upon. For this reason we have connected the various cameras with a single source of electrical energy, the cameras being driven by synchronous motors so that all of the cameras are operated at the same speed.

This arrangement, however, is not entirely satisfactory as it necessitates the exposure of said three complete lengths of film to the same action, whereas, it is only desired to employ sections from the films exposed in the three cameras in the production of a finished scene. In order to permit any of the three cameras to be operated individually, we then provide a clutch connection between the motor drive and the camera so as to permit a camera to be connected to the motor drive at any desired time.

During the operation of a plurality of cameras in the manner hereinabove described, if a film breaks or piles up within a camera during the operation thereof an additional load is placed upon the motor which causes the same to lose speed and stop. As all of the cameras are operated from a single source of electrical energy the additional load placed upon one of the cameras very often causes all of the cameras to stop, or damage to the mechanism in the camera in which the trouble occurs. This necessitates retaking the scene after the break in the film has been corrected.

An object of this invention is to provide an apparatus for automatically disconnnecting a camera from a motor drive whenever a stoppage of film feed occurs within the camera.

Another object is to provide a mechanism for disconnecting a camera driven from a motor drive whenever a film breaks or buckles within the camera.

Another object of this invention is to disclose and provide a clutch mechanism of simple but efficient construction.

Another object is to disclose and provide a releasing mechanism including a clutch for automatically disconnecting cameras from a motor drive.

Other objects and advantages of this invention and its application to the motion picture industry and photographic equipment will become apparent from the following detailed description, reference being made to the appended drawings in which Figure 1 is a diagrammatic plan representation of one method and apparatus in which the particular device embraced by this invention may be employed.

Figure 2 is a side elevation of a camera head equipped with a clutch in accordance with this invention.

Figure 3 is a side elevation partially in section of a part of a feeding mechanism and release mechanism of a camera.

Figure 4 is a longitudinal section through a clutch.

Figure 5 is a transverse section taken through the clutch shown in Figure 4 along the line indicated at 5—5.

Figure 6 is a transverse section taken along the line 6—6 through the clutch illustrated in Figure 4.

Figure 7 is a horizontal section through a locking pin, the view being taken along line 7—7 of Figure 4.

Figure 8 is a side elevation partially in section of a modified form of camera feed and clutch release mechanism.

Figure 9 is a horizontal section taken along the line 9—9 of Figure 8.

Referring more particularly to Figure 2, a camera head is illustrated there in which the camera frame 1 is provided with a clutch 2 connecting a flexible drive shaft 3 with the camera shutter shaft within the camera. The camera shutter shaft 4 is illustrated in Figure 4. The camera is further equipped with the camera crank 5a connected to the camera shutter shaft and movement in the customary manner. The camera is in substantially all particulars a standard form of cinematographic machine and it is to be understood that the actual form of the camera may be changed materially without departing from the present invention.

The clutch mechanism 2 is preferably attached to the camera 1 by means of a latch 5 carried by the lower flange 6 of the clutch member and yieldably urged therefrom by means of a compression spring 7. The latch is shown in detail in Figures 4, 5 and 7. The latch member 5 fits into a milled slot wherein the latch 5 is pivoted upon a pin 8.

One end of the latch member 5 is provided with a protuberance 9 adapted to engage with a ledge or boss formed in the camera frame. The opposing end of the latch member 5 is loosely received within an annular slot made in a circular member 10 slidably received in an aperture formed in the lower flange 6 of the clutch member 2.

The clutch member 2 comprises a casing having a cylindrical extension 11 adapted to fit into an opening surrounding the camera shutter shaft 4. Bearings 12 are positioned within the clutch member 2, the bearings 12 being mounted within a sleeve 13 provided with an outwardly extending flange 14. The inner bearing races 15 are mounted upon a quill shaft 16 by reason of a shoulder 17 against which the bearing races 15 are pressed by means of a nut 18 threadedly engaged with a portion of the quill 16. A spacing collar 19 may be introduced between the bearing races 15. In this manner the quill 16 is rotatably mounted within the clutch housing 2.

The bearings 12 and the quill 16 may be maintained in position within the clutch member 2 by means of a gland member 20, provided with a flange 21 cooperating with the flange 14 of the sleeve 13. The sleeve 13 may be connected to the clutch housing 2 by means of machine screws 22.

Mounted upon the end of the quill 16 is a sleeve member 23 whose outer portion is slidably received within the cylindrical extension 11. The sleeve 23 abuts the shoulder 17 formed in the quill member 16 and is slidably mounted upon said quill. A driving connection is formed between the quill and the sleeve 23 as follows:

Opposed tangential milled flats 24 are formed in the end of the quill shaft 16 up to the location of the shoulder 17, as shown in Figures 5, 6 and 7. These milled flats receive rollers 25 rotatably held in place within the sleeve 23 by means of pins 26. The pins 26 and the rollers 25 are retained within the sleeve 23 by means of a collar 27.

In this manner the rotation of the quill 16 causes a rotation of the sleeve 23 which at its outer end is provided with a squared aperture or socket 28 adapted to receive the end of the camera shutter shaft 4.

Movement of the collar 23 upon the quill 16 may be accomplished by means of a yoke 29 provided with rollers 30 pivotally connected to the yoke by means of pins 31, the rollers 30 being slidably received within an annular race or groove 32 formed exteriorly of the sleeve 23.

The yoke 29 may be connected to a shaft 33 journaled transversely of the quill 16 in a boss 34 formed in the housing 2 of the clutch. A lever 34a may be connected to the shaft 33 exteriorly of the housing 2, the lever 34a being provided with a pusher plate 35.

A rocking motion imparted to the lever 34a will therefore partially rotate the shaft 33 and cause the yoke 29 to move through a corresponding arc within the clutch housing. This motion of the yoke 29 imparts a longitudinal motion to the sleeve 23 upon the quill 16. Rotation of the sleeve 23 is not interfered with by the longitudinal motion thereof upon the quill 16.

Normally the lever 34a is maintained in a position adapted to cause the sleeve 23 to cooperate through its socket 28 with the end of the camera shutter shaft 4. In other words, the sleeve 23 is normally advanced into the cylindrical extension 11 as far as such extension is permitted. Driving connection is still maintained between the quill 16 and the sleeve 23 in such advanced position by means of the rollers 25 cooperating with the milled flats 24. Such advanced position of the lever 34a is yieldably maintained by means of a compression spring 36 positioned between the pusher plate 35 formed in the lever 34 and a stationary stop 37 formed in the exterior of the housing 2 of the clutch. In Figure 4 the clutch is shown in disengaged position but normally the sleeve 23 would be advanced and cooperate with the end of the camera shutter shaft 4.

Referring to Figure 1 the various cameras 1a, 1b and 1c—may be equipped with the hereinabove described clutch mechanisms 2a, 2b and 2c, respectively. Each of said cameras may be provided with motor 38 which is connected to the cameras by flexible drive shafts 3a, 3b and 3c. As illustrated in Figure 4, the flexible drive shaft 3 may be provided with a housing 39, the end of the drive shaft 3 being connected to a coupling member 40 provided with a flatted end 41. The coupling member 40 is introduced into the clutch member 2 through the gland 20, the housing 39 being connected to the gland 20 by means of a machine screw 42, or other suitable means. The rotatable coupling member 40 and the flatted end 41 thereof are inserted into the quill 16, the end of the coupling member 40 cooperating with a pin 43 positioned transversely of the bore of the quill shaft 16. A driving connection is thereby established between the quill and the flexible shaft 3.

Electrical energy is then supplied from a suitable source to the various motors 38 and in this way the cameras 1a, 1b and 1c operated in synchronism. If it is desired to operate cameras 1a and 1c only, then the lever 34a is moved rotatably against the compressive force of the spring 36 thereby disengaging the sleeve 23 from engagement with the camera shutter shaft 4 of the camera 1b.

The quill 16 of the clutch member 2b of that camera is still revolving, however, and when it is again desired to operate the camera 1b and obtain close-ups of the action the lever 34a may be released causing the yoke 29 to move the sleeve 23 into engagement with the camera shutter shaft 4.

In order to prevent the motor 38 of camera 1b from being subjected to a heavy starting load when the camera 1b is operatively connected to the flexible shaft 3b of motor 38, it may be advisable to first bring the camera mechanism up to approximately the proper speed by manual operation of the crank handle 5. After the camera mechanism has been brought up to approximately the proper speed the lever 34 may then be released and the camera shutter shaft 4 connected with the motor drive through the clutch member.

In Figure 3, 44 represents the feed and take up sprocket against which the film is held by the guard rollers 45 and 46. The film 47 is normally threaded through the machine in the manner indicated. If the film breaks within the camera it generally piles up at the feed sprocket 44. This increases the load on the driving mechanism and, if the cameras are connected together as shown in Figure 1, all of the cameras 1a, 1b and 1c would stop, or damage be caused to the mechanism in the camera in which the film breaks or buckles.

In order to obviate this occurrence we provide a shoe 48 pivoted as at 49 immediately back of the feed sprocket 44. The shoe 48 may be provided with a flanged portion 50 provided with an arcuate groove 51 cooperating with a pin 52 attached to the body of the camera. The shoe 48 is maintained normally in close juxtaposition with the feeding sprocket 44 by means of a pusher pin 53 provided with a compression spring 54.

The pusher pin 53 cooperates with the pusher plate 35 of the lever 34a.

When the film 47 breaks within the camera while it is in operation, through the clutch mechanism 2 hereinabove described, the film will force the shoe 48 outwardly against the compression spring 54 thereby causing the pin 53 to press against the pusher plate 35 and move lever 34a together with its shaft 33 and yoke member 29 so as to cause the sleeve 23 to disengage from the camera shutter shaft 4. In this manner the camera is automatically stopped or disengaged from the motor drive without imparting such a high load to the source of power as to cause the other cameras to also stop, or damage to the mechanism in the camera in which the trouble occurs.

In Figure 8 a modified form of construction is shown, this modification being the adaptation of the apparatus to a different form of camera. There the shoe 48' is pivoted at 49' and is connected to a rod 55 extending through the casing of the camera. The rod 55 may carry a collar 56 and a compression spring 57 may be positioned upon the rod between the casing 58 and the collar 56 so as to cause the rod 55 to be urged outwardly thereby positioning the shoe 48' a suitable distance away from the path of the film 47.

The rod 55 is then connected to a lever 59 pivoted at 60 exteriorly of the casing, the other end of the lever bearing against the pusher plate 35 of the lever 34a. The operation of this modification is similar to that shown in Figure 3.

From the hereinabove description it will be readily understood that the driving connection to the camera, or other photographic apparatus, may be automatically discontinued by translation of movement of the shoe members within the camera to the clutch member exteriorly of the camera. The shoe members, such as the members 48 and 48', are adapted to respond to the changes in or inequalities in film passage through the camera. Normally the clutch is in engaged position transmitting power from the driving connection to the driven member within the photographic apparatus, for example, to the camera shutter shaft 4.

It is, of course, unnecessary to wholly rely upon the movement of the shoe within the camera to disconnect the camera from the driving member 3. The camera may be disconnected and the clutch disengaged at any time by moving the lever 34a manually. Such movement does not in any way affect the shoe 48 within the camera.

Although one particular form of clutch and its adaptation to a photographic apparatus has been described herein, it is to be understood that the invention is not limited to the precise arrangement and combination of elements described, but embraces all such changes and modifications of the invention which come within the scope of the following claims.

We claim:

1. A clutch member comprising in combination a housing, a rotatable quill within said casing, means for forming a driving connection with said quill, a longitudinally movable sleeve upon said quill within said housing, diametrically opposed longitudinal flats in said quill, rotatable rollers carried by said sleeve, said rollers cooperating with said flats and means for moving said sleeve and rollers longitudinally upon said quill.

2. A clutch member comprising in combination a housing, a rotatable quill within said housing, means carried by said quill adapted to cooperate with a driving connection, longitudinal flats in said quill, a longitudinally movable sleeve upon said quill, rotatable rollers carried by said sleeve and cooperating with said flats a yoke loosely engaging said sleeve, said yoke being mounted upon a shaft extending outwardly of said housing, and a lever connected to said shaft exteriorly of said housing for moving said sleeve and rollers longitudinally upon said quill.

3. A clutch member comprising in combination a housing, a rotatable quill within said housing, means carried by said quill adapted to cooperate with a driving connection, diametrically opposed longitudinal flats in said quill, said flats being provided with a radial face, a longitudinally movable sleeve upon said quill, rotatable rollers carried by said sleeve and adapted to roll on said radial face and means for moving said sleeve and rollers longitudinally upon said quill.

4. A clutch member comprising in combination a housing, a rotatable quill within said housing, means carried by said quill for forming a driving connection therewith, diametrically opposed longitudinal flats in said quill provided with a radial face, a longitudinally movable sleeve upon said quill within said housing, said sleeve being adapted to cooperate with a driven member, rotatable rollers carried by said sleeve and adapted to roll upon said radial face, said rollers forming a driving connection between said quill and sleeve, and means positioned exteriorly of said housing for moving said sleeve and rollers longitudinally upon said quill into engagement with said driven member.

Signed at Los Angeles, Calif., this 2nd day of March, 1929.

ANTHONY G. WISE.
JOHN ARNOLD.